United States Patent
Pauliukonis

[11] 4,220,312
[45] Sep. 2, 1980

[54] CRYOSOLENOID VALVE

[76] Inventor: Richard S. Pauliukonis, 6660 Greenbriar Dr., Cleveland, Ohio 44130

[21] Appl. No.: 859,810

[22] Filed: Dec. 12, 1977

[51] Int. Cl.³ .................. F16K 31/06; F16K 31/122; F16K 49/00
[52] U.S. Cl. ................................ 251/30; 137/334; 62/52; 62/514 R; 251/38; 251/43
[58] Field of Search .................... 251/38, 43, 30; 137/334; 62/52, 514 R

[56] References Cited

U.S. PATENT DOCUMENTS

| | | | |
|---|---|---|---|
| 2,654,393 | 10/1953 | Ghormley | 251/38 X |
| 3,404,865 | 10/1968 | Nelson | 137/334 X |
| 3,460,798 | 8/1969 | Carsten | 251/30 |
| 3,698,682 | 10/1972 | Berning et al. | 251/30 |
| 3,801,063 | 4/1974 | Holmes | 251/30 |
| 3,833,015 | 9/1974 | Knever | 137/334 |

FOREIGN PATENT DOCUMENTS 2271475  12/1975  France .................................... 137/334

Primary Examiner—Arnold Rosenthal
Attorney, Agent, or Firm—Richard S. Pauliukonis

[57] ABSTRACT

An internally piloted shut-off valve for use with cryogenic fluids incorporates a short valve housing with normally closed valve closure means incorporated therein and fluid passages with ports for fluid flow therethrough including an elongated extended stem protruding therefrom on top of which a solenoid operator is received in the stem end opening so as to define a cavity therein housing a large piston interconnected with the valve closure means by an internally piloted concentric tubing disposed coaxially with the stem and, in combination with large piston, comprising valve actuating means which permit the use of conventional solenoid operator and a trickle of cryogenic fluid converted to vapor inside pilot passage of the tubing and supplied to the cavity at atmospheric temperature when solenoid is enerized, creating pressure differential therein capable of maintaining valve open until the solenoid operator is de-energized, allowing valve closing automatically.

6 Claims, 1 Drawing Figure

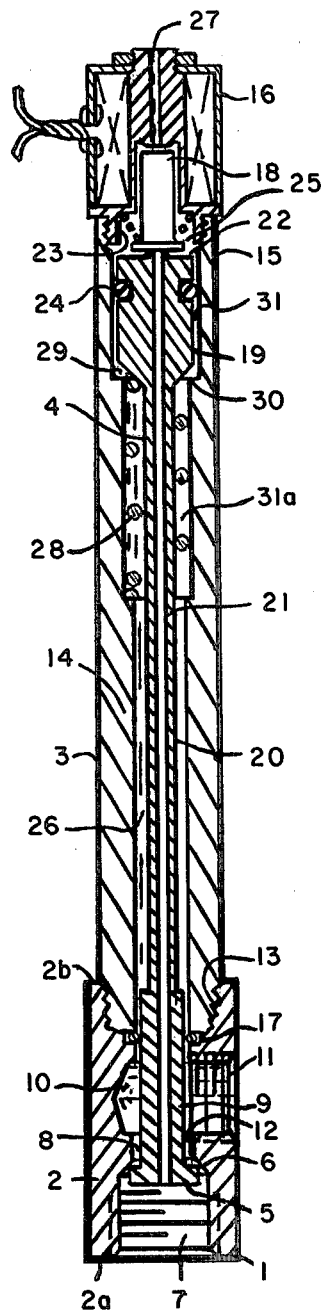

CRYOSOLENOID VALVE

This invention relates to cryogenic valves used with Dewars that contain fluids at extremely low temperatures, and more particularly to cryosolenoid valves provided with electrically actuated solenoid operators suitable for use in liquid transfer from a cryogenic storage vessel containing saturated fluids at elevated pressures.

In fluid transfer from Dewars, cryogenic liquids at temperatures substantially below zero degrees Fahrenheit, and sometimes as low as minus 460° F., require special valves because they not only freeze internally but also ice up externally. In turn special materials are emploeyd in the construction of valves that serve cryogenic applications. Such valves can be manual or pilot operated, or of solenoid type. Mostly such valves require operators, be it a manual valve wheel, or a solenoid operator, located as far a distance from the valving member as possible to prevent icing up of such operators rendering them inoperative. Extended stems provide means for locating operators remotely from the main valve housing having valving member incorporated therein. However, often such extended stems are not long enough to protect operators such as the solenoid type operator, and if made any longer, render such valves with such extended stems impractical. In turn, solenoid operators used with cryogenic valves become very complicated and costly, and so are cryoselenoid valves.

A principal object of the present invention is to provide a cryoselenoid valve which incorporates all provisions for a well built cryogenic valve but does not require the use of special and costly solenoid operators.

A further object of the invention is to provide a cryosolenoid valve which employs fluid dynamics for valve operation to result in reduced size and capacity of an electrical solenoid.

Another object of the invention is to use internal piloting with differential surfaces in valve design for utilization of force differential, surfaces of different diameters provide to enable the use of small conventional solenoid operators.

Another object of this invention is to design a cryogenic solenoid operated valve that can employ non-cryogenic electrical solenoid operator successfully, reducing the cost of such valves.

Another object of this invention is to provide a cryogenic solenoid operated valve of small envelop but huge flow capacity independent of system pressures.

Other objects reside in the novel details of construction and combination of parts all of which will be apparent from the description that follows:

In the drawing is a cross-sectional view of the valve identifying basic arrangement of the parts assembled to render valve ready for use with cryogenic fluids.

Referring to the drawing, we can see that the valve assembly 1 can be divided into a valve housing 2, having a first bottom end 2a and a second top end 2b interconnected by a bore 8 passing therethrough with a fluid supply port 7 and a fluid exhaust port 11 at right angles, and an extended stem assembly 3 inside of which a piston assembly 4 is shown, identifying a valve poppet 5, adaptable to be moved up and down inside a valve seat 6 comprising a shoulder at the end of the fluid supply port 7. Port 7 enters bore 8 partway at the bottom end 2a of the housing 2 with a diameter larger than the diameter of a reduced size bore portion 12 which goes inwardly receiving an undercup poppet boss 9 which crosses a large fluid passage 10 created therein by the exhaust port 11 entering housing bore 8 perpendicularly through a side wall. Bore end 8 at the top housing end 2b is provided with a counterbore 13, entering partway inwardly toward exhaust port 11 and terminating with appropriate groove for housing a seal 17 around the boss 9. Counterbore 13 receives an extended stem 14, which is shown as a slender pipe of the assembly 3 protruding upwardly therefrom, terminating at the opposite top end 15, spaced a substantial distance away from the housing 2, with a coaxially mounted electrical solenoid operator 16 which includes a spring loaded plunger 18, axially movable therein in a working relationship with a piston 19 of a diameter larger than the diameter of the valve poppet 5 located a distance away inside fluid supply port 7 and interconnected by a thin walled small diameter tubing 20 passing centrally inside extended stem 14 and, in combination, comprising piston assembly 4 mentioned before. An internal pilot port 21 initiating in said poppet 5 where it is in direct contact with pressurized cryogenic fluid valved, supplied by port 7, passes inside tubing 20 and piston 19 to exit centrally from piston face 22, when solenoid operator is energized, into a fluid cavity 25 formed between piston 19 and bottom 23 of operator 16 at the top end 15 of the extended stem where plunger 18 resides. When the solenoid operator 16 is not energized electrically, as is the case shown in the drawing, identifying this valve in a first valve closed position with no fluid passing through the valve between ports 7 and 11, the cavity 25 is vented to atmosphere via a solenoid exhaust port 27 while plunger 18 keeps pilot port 21 closed, allowing valve poppet 5 to be seated inside valve seat 6 by a pressure end force poppet 5 experiences upwardly, which is substantial due to a rather large diameter of the poppet shown, eventhough it is considerably smaller than the diameter of the piston 19 of discussed piston assembly 4, but nevertheless constant due to prevailing fluid pressure entering fluid supply port 7. Should fluid pressure be small, valve closing by the use of valving means valve poppet 5 inside valve seat 6 facilitates can be augmented by a compression spring 28, representing optional means for maintaining valve in a first valve closed position wherein piston bore 31 with a stop shoulder 30 at stem end 15 is further provided with another smaller counterbore 31a to receive spring 28 so as to abut the underside 29 of piston 19 providing a constant spring force to the piston assembly 4 with capability of automatic valve closing alone or in combination with fluid pressure force acting inside port 7, whenever the solenoid operator is not energized or when it is de-energized for change of valve position. A seal 24 inside a peripheral groove of piston 19 not only prevents atmospheric air entering stem annulus 26, formed between inside pipe of the extended stem 14 and outside of the tubing 20, when operator 16 is de-energized as shown in the drawing but also, when operator 16 is energized during valve operation, permits pressure build-up inside fluid cavity 25 formed therein when plunger 18 closes vent 27.

Annulus 26 serves many purposes, first is to act as insulating media during valve operation when valve housing is subjected to very low cryogenic temperatures, sometimes at minus 460° F. This cools housing outside to the point that it freezes-out moisture from the air accumulating therein in an ice ball, lowering the temperatures of other components such as stem 14 as well, unless they are well insulated or of non-conductive materials, such as Teflon which incidentally is also non-wetting. Therefore, no ice will adhere to Teflon, and also it reduces heat loss, thereby reducing amount of fluid vaporized in transfer from port 7 to port 11. An additional feature of having annulus 26 act as a good insulator is to enable the use of simple actuators for valve operators. Tests indicated that having extended stem 14 with annulus 26, coupled with piston assembly 4 with pilot port 21, the use of insulated, complex, short-lived and costly operator is avoided. Shown instead is a non-cryogenic, uninsulated, simple and small solenoid operator 16 sold for use universally at less cost than operators designated for cryogenic use. Placing the solenoid operator on top 15 of stem 14 at a distance from valve housing when coupled with internal pilot means for valve operation has indeed satisfied all objectives set forth for this valve. However, to prevent vapor accumulation inside annulus 26 and thereby improve the state of the art of cryosolenoid valves, the use of seal 17, often optional, is recommended. With seals 17 and 24 protecting annulus 26, moisture trapped therein freezes out resulting in partial vacuum inside annulus 26 with additional improvements of insulating values thereof, even if stem 14 is not made from Teflon since the design is not limited to any materials of construction.

The operation of cryosolenoid valve is simple, but it requires electric power. Energizing solenoid operator electrically in effect defines valve operating means wherein the first valve closed position becomes changed to a second valve open position in the following sequence of events not shown by the drawing, but self-explanatory to those skilled in the art through a description that follows.

To allow unrestricted flow through the valve with minimum pressure drop fluid passing around poppet 5 as well as boss 9 from the supply port 7 via internal valve passages to the exhaust 11 may develop, the poppet 5 must be lowered from seat 6 substantially. This can be accomplished by the help of differential surface area piston 19 provides using fluid dynamics wherein when solenoid operator 16 is energized electrically, the plunger 18 uncovers pilot port 21 on the piston face 22, while simultaneously closing solenoid exhaust port 27, to allow pressurized pilot fluid in a vapor form and of small trickle to enter solenoid cavity 25 excerting an end force larger than the opposing end force poppet 5 constantly experiences, thereby shifting piston assembly 4 down until piston underside 29 bottoms stop 30 assuming a second valve open position by lowering together valve poppet 5 from valve seat 6, rendering the valve fully open with established flow between ports 7 and 11 for as long as the solenoid operator 16 is energized and the plunger 18 is held therein by a magnetic force operator 16 develps. De-energization of the solenoid operator 16 eliminates the end force from said piston due to venting of pilot fluid via exhaust port 21 enabling said automatic poppet return to the valve seat 6 when said piston assembly 4 shifts back upward rendering valve closed. Automatic valve closing occurs due to the constantly prevailing pressure end force over the poppet 5 mentioned.

Some changes may be made in the construction and arrangement of the details without departing from the real spirit and scope of this invention, disclosed and claimed herein.

What is claimed is:

1. An internally piloted cryogenic solenoid valve comprising:
    a valve housing having a first bottom end and a second top end interconnected by a bore passing therethrough, incorporates a means for valving substantially midway thereof,
    at least a pair of fluid ports in said housing and a first bore end serving as a first port for a fluid supply thereto comprising an integral part thereof while a second fluid port serving as a fluid exhaust therefrom enters said bore perpendicularly through a side wall adjacent said means for valving toward said second top end of said housing,
    a second bore end at said top end of said housing counterbored partway inwardly toward said first bore end adjacent said second fluid port,
    an extended stem from slender pipe with a first and a second ends threaded has said first end permanently secured inside said second bore end so as to protrude from said top end of said housing while said second end thereof a substantial distance away therefrom is closed by a coaxially mounted solenoid operator having a plunger axially movable inside said operator in a working relationship with said means for valving,
    a long small diameter thin wall tubing, passing centrally through the inside of said extended stem of said slender pipe, terminates at one end inside said valve housing with a valve poppet of said means for valving while the other opposite tubing end connects to a piston of a diameter larger than the diameter of said valve poppet, said piston, housed adjacent said solenoid operator, in combination therewith forms a fluid cavity inside said second end of said extended stem,
    said valve poppet and said piston so interconnected by said thin wall tubing receives a pilot port passing centrally therethorugh, comprising in combination a piston assembly for valve actuation wherein said plunger of said operator controls the fluid flow through said pilot port into said fluid cavity thereby providing means for valve operation from a first valve closed to a second valve open positions by a vapor entering and leaving said fluid cavity, including means for venting said fluid cavity,
    wherein when said solenoid operator is energized electrically, said fluid cavity and said piston become pressurized exerting an end force large enough to move said piston assembly from first to second positions rendering valve open, de-energization of said solenoid operator automatically returns said valve into said first valve closed position by a fluid pressure exerting an opposite end force at said valve poppet and maintaining valve closed when said piston is not subjected to said pilot pressure.

2. An internally piloted cryogenic solenoid valve as in claim 1 wherein said second end of said stem has inside diameter of said pipe enlarged partway inwardly and provided with a spring which pushes on the underside of said piston to insure that said assembly for valve actuation renders valve closed when said piston is not subjected to said pilot pressure and said end force at said valve poppet is low, said spring force together with said poppet force not exceeding the total end force developed at said piston when said fluid cavity and said piston become pressurized by said pilot fluid to render valve operational.

3. An internally piloted cryogenic solenoid valve comprising:

a valve housing having first and second ends interconnected by a bore passing therethrough including two fluid ports of which a first is fluid supply and a second is fluid exhaust port, and a valving means incorporated therein, an extended hollow stem protruding from said housing including an electric solenoid operator mounted coaxially therewith on top thereof at a distance from said housing, and internal pilot fluid means for valve actuation, said solenoid operator and said pilot fluid means providing in combination a means for valve operation with position change from a first valve closed to a second valve open positions wherein said pilot fluid means for valve actuation is purely dependent on said electric solenoid operator, and when said solenoid operator is energized electrically, said pilot fluid means for valve actuation open said valving means, and when said solenoid operator is de-energized, said valving means close automatically, said first fluid supply port enters said bore at said first housing end and said second fluid exhaust port enters said bore perpendicularly through a side wall of said housing, a valve seat inside said bore located substantially midway therein at the end of said first fluid supply port and comprising a part thereof, said valving means further includes an axially movable valve poppet secured to a thin walled small diameter tubing passing centrally inside said extended hollow stem, terminating with a piston of a diameter larger than the diameter of said valve poppet adjacent said solenoid operator, said piston and said valve poppet so interconnected by said tubing comprising a piston assembly provided with a pilot port of said pilot fluid means passing therethrough for supply of pilot fluid from said first fluid supply port into a fluid cavity formed between said operator and said piston, said fluid cavity and said piston become pressurized exerting an end force larger than the opposing end force said poppet constantly experiences thereby lowering said poppet from said valve seat to render valve open when said operator is energized and said piston assembly is shifted down by said pilot fluid means, de-energization of said solenoid operator eliminates said end force from said piston enabling an automatic poppet return to said valve seat when said piston assembly shifts back into said first valve closed position by said poppet end force constantly prevailing therein.

4. An internally piloted cryogenic solenoid valve comprising:

a valve housing having first and second ends interconnected by a bore passing therethrough including two fluid ports of which a first is a fluid supply and a second is a fluid exhaust port, and a valving means incorporated therein, an extended hollow stem protruding from said housing including an electric solenoid operator mounted coaxially therewith on top thereof at a distance from said housing, and an internal pilot fluid means for valve actuation, said solenoid operator and said pilot fluid means providing in combination a means for valve operation with position change from a first valve closed to a second valve open positions wherein said pilot fluid means for valve actuation is purely dependent on said solenoid operator, and when said solenoid operator is energized electrically, said pilot fluid means for valve actuation open said valving means, and when said solenoid operator is de-energized, said valving means close automatically, said bore including fluid passages between said ports, and said first port enters said bore inwardly toward said second housing end partway terminating with a shoulder of a reduced size bore portion with a diameter smaller than the diameter of said first port, while said second port enters said bore through a side wall adjacent said shoulder into said reduced size bore portion, said shoulder serving as a seat for said valving means, said valving means further include a valve poppet of a diameter larger than said reduced size bore portion but smaller than said first port to facilitate fluid flow around said poppet when said valve is in said second position with said poppet lowered from said seat of said valving means, and when said valve is in said first valve closed position, said poppet becomes seated inside said seat of said valving means rendering said valve closed, an elongated piston assembly having said poppet on a first end thereof to serve as said valving means is further provided at a second end thereof with a piston of a diameter larger than the diameter of said poppet, said poppet and said piston interconnected by a thin walled small diameter tubing passing centrally inside said extended stem comprising in combination said piston assembly representing said means for valve actuation wherein when said operator is energized electrically, said piston becomes pressurized by a pilot pressure supplied via a pilot port of said pilot fluid means passing between said poppet and said piston to exit therefrom into a cavity formed between said solenoid operator end and said piston face exerting an end force over said piston large enough to shift said piston assembly with said poppet into said second valve open position for fluid communication between said ports, said extended stem forming an annulus along the length thereof between said small diameter tubing passing centrally therethrough including a seal inside said piston periphery to protect said annulus from atmosphere when said cavity is vented and said operator is de-energized for valve position change to a first valve closed position automatically, and when said operator is energized, said seal inside said piston periphery allowing pilot fluid pressure inside said cavity exert said piston end force with position change, and vice versa.

5. A valve as in claim 3 wherein said extended stem having said thin walled small diameter tubing passing centrally therethrough forming an annulus therebetween protected at each end thereof by a pair of seals with a first seal incorporated into said piston periphery and a second seal incorporated into said housing at the bottom of said first end of said extended stem.

6. A valve as in claim 3 wherein said annulus is protected by another seal inside said housing around said undercut boss of said poppet thereby receiving seals from both ends of said annulus to insure that when valve is in service, the moisture in the residual air that was present in said annulus is frozen out by cold surfaces of said housing passing cryogenic fluids therethrough at very low temperatures, sometimes close to minus 460° F., generating thereby a partial vacuum is said annulus for less heat loss from the valve.

* * * * *